Figure 1:
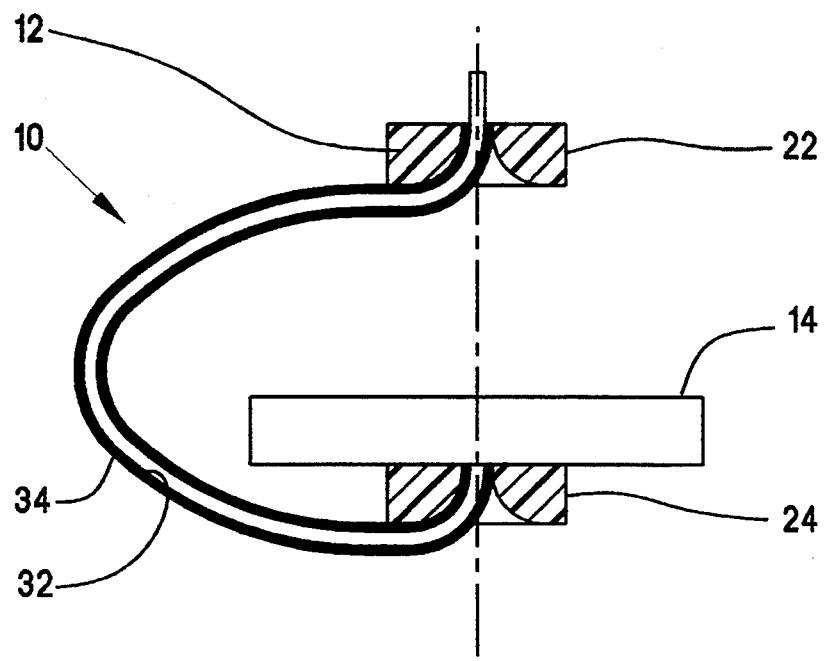

United States Patent

Witthaus et al.

Patent Number: 5,449,022
Date of Patent: Sep. 12, 1995

[54] HOSE ARRANGEMENT FOR A SEALESS CENTRIFUGE HAVING HOSES COMPRISED OF LAYERS OF DIFFERENT HARDNESS

[75] Inventors: Friedrich Witthaus, St. Wendel; Carlo Lay, Saarwellingen; Wolfgang Biesel, Ottweiler, all of Germany

[73] Assignee: Fresenius, A.G., Bad Homburg, Germany

[21] Appl. No.: 220,120

[22] Filed: Mar. 30, 1994

[30] Foreign Application Priority Data

Apr. 3, 1993 [DE] Germany ............ 43 10 975.6

[51] Int. Cl.6 .................................. F16L 11/12
[52] U.S. Cl. ........................ 138/137; 138/103; 138/111; 494/42
[58] Field of Search ............. 138/103, 109, 111, 137, 138/141, 174, 125; 494/42

[56] References Cited

U.S. PATENT DOCUMENTS

| 2,624,366 | 1/1953 | Pugh | 138/137 |
|---|---|---|---|
| 3,184,358 | 5/1965 | Utz | 138/141 |
| 3,411,981 | 11/1968 | Thomas | 138/141 |
| 3,669,503 | 6/1972 | Zimmermann | 138/137 |
| 3,752,617 | 8/1973 | Burlis et al. | 138/137 |
| 3,871,408 | 3/1975 | Wood et al. | 138/137 |
| 3,891,007 | 6/1975 | Kleykamp | 138/137 |
| 4,164,318 | 8/1979 | Boggs . | |
| 4,211,741 | 7/1980 | Ostoich | 138/141 |
| 4,299,256 | 11/1981 | Bacehowsi et al. . | |
| 4,303,457 | 12/1981 | Johansen et al. | 138/125 |
| 5,154,357 | 10/1992 | Jamison et al. | 138/137 |

OTHER PUBLICATIONS

German Office Action dated Nov. 15, 1993 of appl. P 43 10 975.6-23.

Primary Examiner—James E. Bryant, III
Attorney, Agent, or Firm—Omri M. Behr; Matthew J. McDonald

[57] ABSTRACT

Hose arrangement for a seal-less centrifuge having a soft inner layer and a hard outer layer and is formed by means of coextrusion.

3 Claims, 2 Drawing Sheets

1

HOSE ARRANGEMENT FOR A SEALESS CENTRIFUGE HAVING HOSES COMPRISED OF LAYERS OF DIFFERENT HARDNESS

BACKGROUND OF THE INVENTION

1. Field of the Invention

The invention is directed to a hose arrangement for a seal-less centrifuge.

2. Discussion of the Prior Art

For the separation of cell suspensions such as blood, there are utilized seal-less centrifuges such as those described, for example, in German Patent DE A 32 42 541. In this apparatus, the blood is led via a hose arrangement to the centrifuge in which it is separated into its component parts which are then led out through different channels in the hose arrangement. Herein the hose arrangement is stationery at its input end and runs from this input end in a loop around the rotor of the centrifuge and exits at its other end into the separation chamber of the centrifuge. If no avoiding steps are taken a twisting occurs and thus a ripping of the hose arrangement between the fixed end on the one hand and the other end rotating with the speed of the centrifuge. To avoid this the hose arrangement, while being lead around the rotating centrifuge chamber is subjected to a constant de-twisting treatment, that is to say, the hose does not any longer rotate around the separation chamber but rather continuously rotates about its own hose axis in a manner counter to the twisting rotation.

A problem in such hose arrangements is therefore their relative movement which leads to frictional and shearing forces in the hose arrangements. This can have the result on the one hand of a sharp bending of the hose arrangement in its end region and on the other hand to a mutual wearing down of the hose components. In order to reduce the friction and to improve the absorption of the gravitational forces, relatively hard materials have been utilized for the hose arrangement. As a result of the self rotation resulting from de-twisting treatment, the hose arrangement hits against the centrifuge during each rotation which leads to a strong and highly undesired sound generation. On the other hand, if the hose material is made soft, the noise generation is reduced but the wearing down of the hose material increases so that the hose material can eventually wear out.

In order to solve the bending problem, suggestions have been made in U.S. Pat. No. 4,109,852, U.S. Pat. No. 4,164,318 and European published application No. 1 129 90, which propose that the flexible casings at the hose ends should be surrounded by a multi-lumina hose arrangement which serves a plurality of input and output channels. Such individual portions are relatively complex to produce and their installation as well as its use as a disposable article are very expensive. Furthermore, the installation of this hose requires higher service requirements.

To the problem of frictional wear, European Patent Publication EP 2 60 034 offers a flexible hose with a woven abrasion guard. If such a guard is axially stretched, it is pulled together radially and constricts itself on the hose. Such a frictional guard is complex to produce and is substantially unsuited as a disposable article for medical purposes.

Furthermore, it is established that hose leads or complete casings are complex to produce. Additional components such as bearings and like are required in order to assure proper functioning. On the other hand, if the hose itself has no guide parts, a rounded edge on the hose ends can prevent excessive bending, it cannot prevent frictional wear since the hose slides on this rounded end as has been shown in the previous invention.

In U.S. Pat. No. 4,299,256, there is provided a hose arrangement with one or several lumina of at least one polymeric material suitable for a seal-less centrifuge, which is made out of a layer of PVC with a small proportion of silicone oil and an inner layer of a different synthetic material which is silicone oil free. On the one hand, the provision of synthetic material filled with silicone oil is expensive and on the other hand leads to an undesirably soft outer material which does not provide the centrifuge hose with the necessary stability during high centrifuge speeds.

SUMMARY OF THE INVENTION

The task of the invention therefore is to provide a hose arrangement of the above-described type which not only has the necessary solidity and resistance against abrasion but also retains the flexibility which enables it to be utilized during centrifugation without the generation of noise. This problem is solved by providing the hose as a coextruded hose with materials of different hardnesses.

The hose arrangement of the present application is provided as a coextruded hose arrangement comprising an inner softer hose sector and an outer harder hose sector. Such coextruded hoses can be produced by well known extrusion procedures wherein two different molten polymeric materials are fed to a coextrusion jet. During the extrusion there is provided a hose arrangement of two different but mutually strongly adhering hose materials which appear to be a unitary hose construction.

The hose arrangement has the advantage that the outer hard hose layer inhibits the abrasion of the hose material. On the other hand, the inner segment of the hose arrangement is so flexible that it can roll substantially noise-free about its axis which leads to the disappearance of the noise during the rotation of the hose as is known during the enveloping of rubber tires in the mounting of such tires.

As a result therefore, the outer segment absorbs the frictional forces while the inner areas absorb the flexing forces. Thus the demand on the frictional resistance of the material of the inner segment is substantially less, so that a softer material with better stability and less noise generation can be utilized.

The hose material for the outer segment has Shore Hardness D of between 50 and 90, suitably between 60 and 70.

In contrast thereto, the hose material used for the inner hose has a Shore Hardness A of between 50 and 100, preferably 85 to 90, most suitably about 90. The hose arrangements of the present invention are coextruded from thermoplastic materials. Preferred for the polymer material utilized for the outer segment are polyamides, copolymers of polyamide and polyethylene, and the like. For the inner hose in contrast thereto, softer polymeric materials are utilized, for example polyvinyl chloride (PVC) or polyurethane (PU).

In accordance with the present invention one is not limited to two hose layers. It is entirely possible to utilize a plurality of coextruded hose layers wherein the Shore Hardness rises stepwise to the outside. Plural hose bundles of such a type of coextruded single hoses demonstrate an exceedingly high abrasion resistance and thus long use life in a low noise process generated by the moveability and flexibility.

As set forth above as is known in the art, a hose bundle for the provision of the fluid to be separated as well as for the removal of the separated fractions is utilized. In accordance with the present invention, the single hoses have just a single lumen. Thus a plurality of hoses must be utilized for the hose arrangement as is known from U.S. Pat. 4,865,081. These multi-lumina hose arrangements comprise a plurality of single hoses which are, at their ends, are mutually rotated by 180°. The disclosure of this patent is incorporated herein by reference.

In a further modification, the hose can be formed as multi-lumina hose having a soft core of a plurality of lumina and a hard outer sector.

Figure 2:
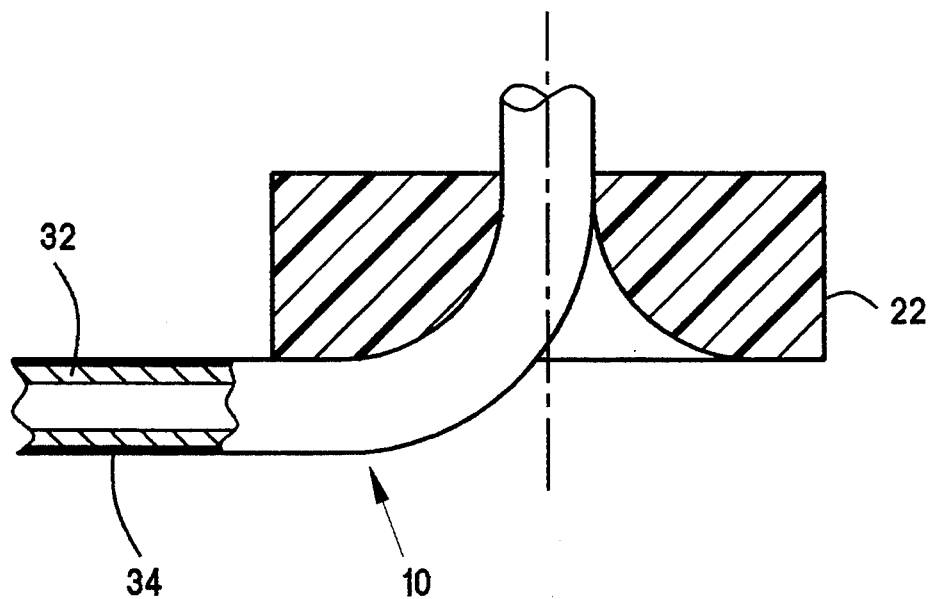

The invention may be exemplified by the drawings which show:

FIG. 1—A schematic representation of the hose arrangement of the present invention, and FIG. 2—A portion of the embodiment shown as a partial cross-sectional view.

Figure 3:
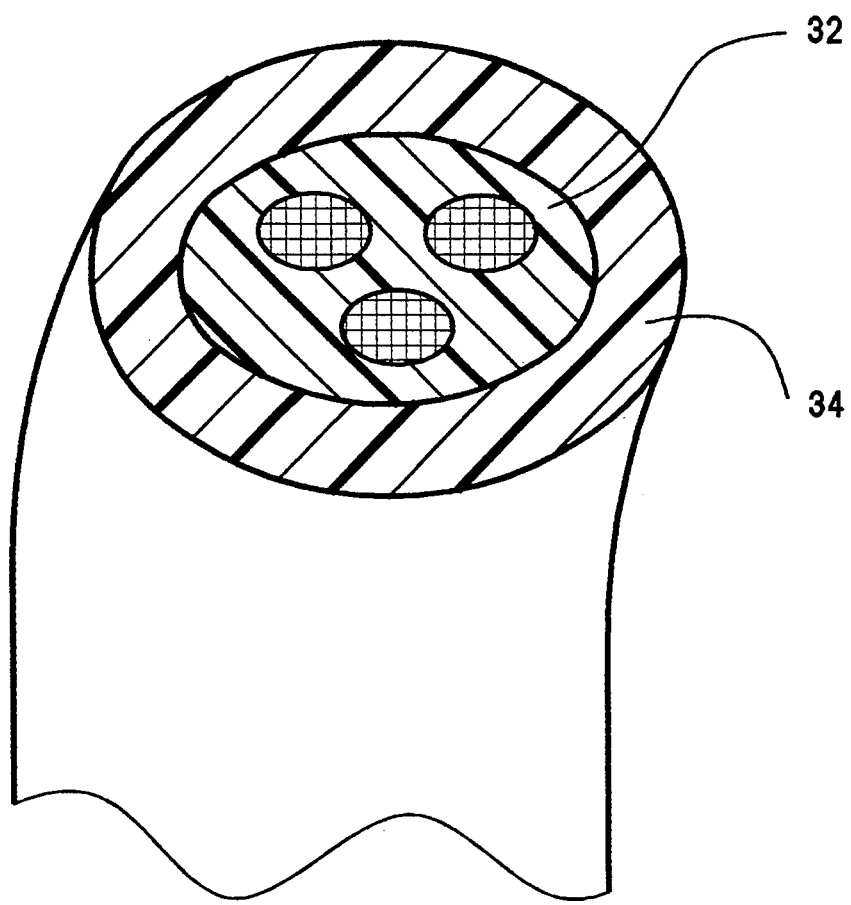

FIG. 3 is a perspective cross-sectional view of a 3 lumina hose.

FIG. 1 shows a hose arrangement 1 in the form of a reverse "question mark" which extends from stationary point 12 to a centrifuge chamber 14. In the environment of stationary point 12 for the improved leading of the hose, there is provided a first hose guide 22, whereas on the underside of the centrifuge chamber 14, there is provided a second hose guide 24.

For reasons of clear visibility only one hose 10 is shown in FIGS. 1 and 2. The input and output of the individual fractions requires the provision of a plurality of hose arrangements 10, as may be seen form the disclosure of U.S. Pat. No. 4,865,081.

FIGS. 1 and 2 show a schematic representation of the hose arrangement 10. The hose arrangement 10 comprises an inner segment 32, which over its whole length is extruded with an outer segment 34. This may particularly be seen from the representation of the detail in FIG. 2.

For a process for the formation of the hose arrangement in accordance with FIGS. 1 and 2, may be found in the coextrusion of a soft inner polymeric material such as polyvinyl chloride or polyurethane and a harder outer material, suitably polyamide. The hose arrangement 10 can be structured in two or more layers of different polymers with step-wise rising Shore Hardness.

We claim:

1. A hose arrangement with one or more lumina of at least one polymeric material for a seal-less centrifuge which hose arrangement comprises at least an inner and an outer layer of at least each one polymeric material with different Shore Hardnesses rising from the inner layer to the outer layer in coextruded form, wherein the inner layer has a Shore Hardness A of 50 to 100 and the outer layer has a Shore Hardness D of from 50 to 90.

2. The hose arrangement in accordance with claim 1 wherein the outer layer has a Shore Hardness D of from 60 to 70 and the inner layer a Shore Hardness A of about 90.

3. The hose arrangement in accordance with claim 1 wherein the outer layer comprises polyamide or co-polymers with polyethylene and the inner layer of polyvinyl chloride, or polyethylene.

* * * * *